United States Patent [19]
Brandin et al.

[11] 3,795,259
[45] Mar. 5, 1974

[54] DEVICE FOR EVENLY MIXING AND DISTRIBUTING A GAS AND LIQUID MIXTURE

[75] Inventors: Tore Brandin; Bo Frejd, both of Norrkoping, Sweden

[73] Assignee: Stal Refrigeration AB, Norrkoping, Sweden

[22] Filed: July 7, 1972

[21] Appl. No.: 269,833

[52] U.S. Cl. .............................. 137/561 A, 62/525
[51] Int. Cl. ....................... F16l 41/00, F17d 1/00
[58] Field of Search..... 137/561 R, 561 A; 285/150, 285/155; 62/204, 205, 210, 504, 525

[56] References Cited
UNITED STATES PATENTS

| | | | |
|---|---|---|---|
| 3,395,730 | 8/1968 | Mennesson | 137/561 R |
| 2,240,537 | 5/1941 | Young | 285/150 |
| 2,787,138 | 4/1957 | Boyle | 62/525 |
| 2,432,859 | 12/1947 | Carter | 137/561 R |
| 2,148,414 | 2/1939 | Wolfert et al. | 62/525 |
| 2,489,680 | 11/1949 | Shoemaker et al. | 62/504 |

*Primary Examiner*—William R. Cline
*Attorney, Agent, or Firm*—Eric Y. Munson

[57] ABSTRACT

A device in which a gas and liquid mixture is introduced into a distribution chamber through an inlet opening at one side thereof the opposite side being in communication with a plurality of tubes for receiving the gas and liquid mixture; a baffle in said distribution chamber extending substantially perpendicularly to the direction of flow of the gas and liquid mixture forming a narrow passageway in which the mixture flows radially outwards along the inlet opening side and radially inwards along the tube side.

7 Claims, 2 Drawing Figures

DEVICE FOR EVENLY MIXING AND DISTRIBUTING A GAS AND LIQUID MIXTURE

BACKGROUND OF THE INVENTION

Such a two-phase mixture is used, for example, in refrigeration plants and may consist of a mixture of gas and liquid refrigerator coolant as the coolant appears immediately subsequent to the expansion valve where some of it has been converted to gas. Oil from the compressor may also occur in the mixture. It is relatively easy to obtain a substantially homogenous mixture of the various phases, this being done most easily with the help of nozzles. However, the mixture is not stable and as the velocity decreases, for example in a distribution chamber for the tubes in a cooler, the phases tend to separate due to the force of gravity, particularly if the tubes extend horizontally. The liquid concentration in the lower tubes therefore increases with the result that the cooling effect is not uniformly distributed between the tubes and is therefore less effective.

In order to avoid this, it is proposed according to the invention that the distribution chamber for the tubes is divided by means of a wall or baffle which guides the flow of the mixture through the chamber so that the flow rate is substantially constant or at most varies only within reasonable limits on its way from the inlet into the distribution chamber until its entry into the tubes. The distribution chamber is therefore designed as specified in the accompanying claims. The object is to maintain the mixture in a homogeneous condition during its passage from the inlet to the separate tubes.

BRIEF DESCRIPTION OF THE DRAWINGS

The distribution chamber and its various parts may be designed in different ways, as will be further described with reference to the accompanying drawings, in which.

DETAILED DESCRIPTION OF A PREFERRED EMBODIMENT

Figure 1:
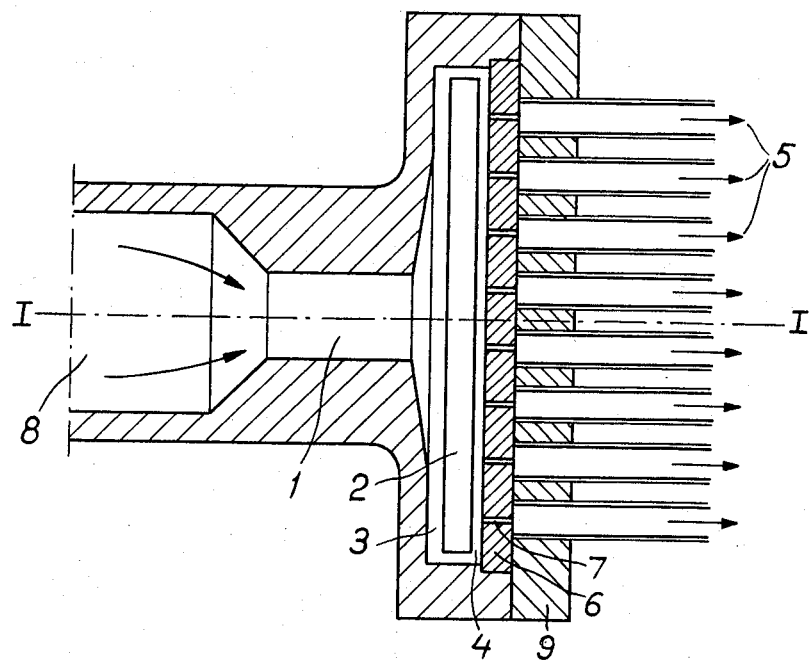
FIG. 1 shows a section through a distribution chamber according to the invention.

FIG. 1 shows a distribution chamber according to the invention. The gas-liquid mixture enters from the left through the tube 8 which continues into a restricted portion or nozzle 1. At this transition point the flow rate is greatly increased so that the mixture becomes more homogenous. This effect can be increased by the construction of the transition, for example by inserting helical vanes or the like in the tube 8. The chamber 8 may even be constructed with tangential inlet, whereby a cyclone effect is achieved.

When the mixture enters the chamber itself, it hits a stationary wall or baffle 2 inserted perpendicularly to the flow direction of the main stream. The mixture is thus prevented from flowing directly through the chamber to the centrally located tubes. Instead, the mixture is forced radially outwards through the gap or passage 3 to the edge of the wall 2 where it turns and flows radially inwards through the gap or passage 4 between the wall 2 and the baffle 6.

The wall 2 is held in position by supports or spacers, not shown. If the gap 3 had a constant width, the flow area in this passage would increase in the radially outward direction. In order to compensate for this the left-hand wall in the chamber has been made conical or funnel-shaped, which shape also improves the flow conditions away from the nozzle 1. The ideal shape of the chamber wall corresponding to constant area and constant flow velocity would be a hyperbolic shape, but a certain deviation therefrom, for example as shown in the drawing, provides a shape which is easier to manufacture and which produces variations in flow velocity and slight eddy formations which enhance the mixing of the phases of the mixture. Instead of making the baffle of the chamber funnel-shaped, the wall 2 may be shaped to deviate somewhat from a flat surface, or a combination of the two alternatives may be used.

The gas-liquid mixture is distributed in the gap 4 or passage between the parallel tubes 5. Since the direction of flow is opposite to that in the gap or passage 3, the flow area of the gap decreases with a constant gap thickness. This means that the velocity can be maintained so that the gas and liquid phases are mixed despite the fact that the quantity decreases due to distribution between the outlets.

In order to achieve good distribution, the pressure drop in the individual outlets to the tubes should be greater than the pressure drop in the distribution gap or passage 4. This can be achieved, for example, by means of small holes 7 in the distribution plate 6 inside the tube plate 9.

The distribution plate 6 may also be made of porous material (for example sintered bronze), whereby the drilling of small holes is avoided. It has been found that the liquid phase has such low viscosity that is passes easily through a porous plate.

The device described herein has been found to produce a uniform distribution of gas and liquid over a large number of outlet openings, for example tubes in a heat-exchanger.

Figure 2:
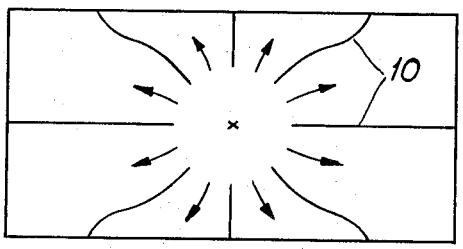
FIG. 2 shows a cross section taken perpendicular to the direction of flow of a modification embodying a rectangular distribution chamber.

The device heretofore described is substantially symmetrical when rotated about an axis I — I. It is possible to achieve relatively uniform distribution even in other cases if the rotary symmetry is maintained up to the start of the gap 3 or a slight distance into the same and guide vanes 10 are then inserted which extend to the edge of a baffle 2 of a different shape than a circular one as shown in FIG. 2. This figure shows a section perpendicular to the main direction of flow in a rectangular chamber.

The reverse side of the baffle may also be provided with channels or guide vanes.

Since the flowing medium is substantially homogenous where the channels or guide vanes start, the quantity per channel can be chosen and maintained within the channel until distribution between the outlets begins.

The division into channels may also be advantageous with rotary symmetrical flow in order to allow greater variations in the quantity of the flowing mixture or in order to keep the pressure drop down by making the gaps 3 and 4 slightly wider.

We claim:

1. A device for distributing a homogeneous gas and liquid mixture to a plurality of outlet tubes comprising:

a. a distribution chamber having spaced inlet and outlet walls and end walls;

b. an inlet passage having an opening located substantially centrally in said inlet wall, and inlet passage having a restricted portion;
c. the outlet wall having means for passing the gas and liquid mixture into said tubes, and;
d. a solid stationary baffle spaced between said walls substantially perpendicular to the direction of flow of said gas and liquid mixture through said inlet opening, said baffle providing a confronting face projecting radially outwardly from said direction of flow a distance substantially greater than the maximum width of said inlet opening to define a flow space area extending radially from the inlet opening about said baffle whereby flow through said chamber is directed radially outwardly and around said baffle to reach said means for passing the gas and liquid mixture into said tubes.

2. A device according to claim 1 in which the baffle is spaced between the walls of said distribution chamber a distance effective to produce a substantially constant flow velocity.

3. A device according to claim 1, in which the inlet wall of the distribution chamber has a substantially conically shaped portion.

4. A device according to claim 1, in which guide vanes are provided between said baffle and said inlet wall.

5. A device according to claim 1, in which said outlet wall is provided with openings which are substantially narrower than said tubes.

6. A device according to claim 1, in which said outlet wall comprises a porous plate.

7. A device according to claim 1, in which said inlet passage comprises a restricted portion.

* * * * *

UNITED STATES PATENT OFFICE
CERTIFICATE OF CORRECTION

Patent No. 3,795,259              Dated March 5, 1974

Inventor(s) Tore Brandin; Bo Frejd

It is certified that error appears in the above-identified patent and that said Letters Patent are hereby corrected as shown below:

[30]   Foreign Application Priority Data

July 7, 1971    Sweden............. 8776/1971

Signed and sealed this 2nd day of July 1974.

(SEAL)
Attest:

EDWARD M. FLETCHER,JR.                C.MARSHALL DANN
Attesting Officer                     Commissioner of Patents